United States Patent
Koizumi

(10) Patent No.: US 11,073,815 B2
(45) Date of Patent: Jul. 27, 2021

(54) COLLECTION DEVICE, COLLECTION METHOD, AND COLLECTION PROGRAM THAT TRANSMIT PARTIAL DATA BELONGING TO STATE DATA AND MATCHING A FIRST CONDITION SET IN ADVANCE

(71) Applicant: FANUC CORPORATION, Yamanashi (JP)

(72) Inventor: Kazuhiro Koizumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 140 days.

(21) Appl. No.: 16/281,598

(22) Filed: Feb. 21, 2019

(65) Prior Publication Data

US 2019/0294143 A1   Sep. 26, 2019

(30) Foreign Application Priority Data

Mar. 26, 2018   (JP) .............................. JP2018-057948

(51) Int. Cl.
  *G05B 19/4065* (2006.01)
  *G05B 19/418* (2006.01)
(52) U.S. Cl.
  CPC ..... *G05B 19/4065* (2013.01); *G05B 19/4183* (2013.01); *G05B 19/4185* (2013.01); *G05B 2219/31088* (2013.01)
(58) Field of Classification Search
  CPC ............ G05B 19/4065; G05B 19/4183; G05B 19/4185; G05B 2219/31088

(Continued)

(56) References Cited

U.S. PATENT DOCUMENTS

2002/0131451 A1*  9/2002  Franke ................... H04L 12/417
                                                                        370/493
2016/0330086 A1*  11/2016  Oda ..................... H04L 12/6418

FOREIGN PATENT DOCUMENTS

JP          1-291598          11/1989
JP         2003-25817          1/2003
(Continued)

OTHER PUBLICATIONS

Notification of Reasons for Refusal dated Feb. 18, 2020 in Japanese Patent Application No. 2018-057948.

(Continued)

*Primary Examiner* — Jigneshkumar C Patel
(74) *Attorney, Agent, or Firm* — Wenderoth, Lind & Ponack, L.L.P.

(57) ABSTRACT

To provide a collection device, a collection method, and a collection program capable of making detailed data in the past available for viewing according to demand while reducing the volume of communication data in a usual state. A collection device comprises: an acquisition unit that acquires state data about a machine in a predetermined cycle; a first transmission unit that transmits partial data belonging to the state data and matching a first condition set in advance to a management server; a storage unit that stores state data not having been transmitted from the first transmission unit to the management server; and a second transmission unit that, in response to a first command including designation of a time in the past, transmits state data from the designated time onward stored in the storage unit to the management server.

8 Claims, 3 Drawing Sheets

(58) Field of Classification Search
USPC .......................................................... 700/17
See application file for complete search history.

(56) References Cited

FOREIGN PATENT DOCUMENTS

| | | |
|---|---|---|
| JP | 2003-173203 | 6/2003 |
| JP | 2004-54357 | 2/2004 |
| JP | 2009-169888 | 7/2009 |
| JP | 2009169888 A * | 7/2009 |
| JP | 2013-45234 | 3/2013 |
| JP | 2013-85195 | 5/2013 |
| JP | 2016-139207 | 8/2016 |
| JP | 2017-103707 | 6/2017 |
| JP | 2017-219926 | 12/2017 |

OTHER PUBLICATIONS

Notification of Reasons for Refusal dated Jun. 2, 2020 in Japanese Patent Application No. 2018-057948.

* cited by examiner

COLLECTION DEVICE, COLLECTION METHOD, AND COLLECTION PROGRAM THAT TRANSMIT PARTIAL DATA BELONGING TO STATE DATA AND MATCHING A FIRST CONDITION SET IN ADVANCE

This application is based on and claims the benefit of priority from Japanese Patent Application No. 2018-057948, filed on 26 Mar. 2018, the content of which is incorporated herein by reference.

BACKGROUND OF THE INVENTION

Field of the Invention

The present invention relates to a collection device, a collection method, and a collection program for collecting state data about a machine.

Related Art

In a conventional operation management system for industrial machines including a machine tool and an industrial robot, a management server collects a variety of pieces of state data including various types of sensor information and command information for managing the operating state of each machine. These pieces of state data are collected periodically by a collection device provided for each machine and transmitted to the management server. With increased types of state data and increased frequencies of acquisition, or with an increased number of machines to be managed, however, the volume of data transmitted from the collection device to the management server is increased. This increases communication load and processing load on the management server.

Reduction in a data volume has been sought by limiting the types of data to be collected by the management server or controlling the frequency of transmission to the management server in response to a data type. According to techniques suggested in patent documents 1 and 2, for example, a transmission frequency is increased in an abnormal state compared to a frequency in a normal state, thereby reducing the volume of data transmitted in the normal state.

Patent Document 1: Japanese Unexamined Patent Application, Publication No. 2017-219926
Patent Document 2: Japanese Unexamined Patent Application, Publication No. 2016-139207

SUMMARY OF THE INVENTION

However, information collected in detail by increasing the frequency of transmission of state data only after detection of an abnormality in a machine has merely been information from the detection of the abnormality onward. Hence, it has been difficult to view detailed information from a specific time in the past such as a point in time when the abnormality was detected in the machine and a period before and after this point in time.

The present invention is intended to provide a collection device, a collection method, and a collection program capable of making detailed data in the past available for viewing according to demand while reducing the volume of communication data in a usual state.

(1) A collection device according to the present invention (collection device 10 described later, for example) comprises: an acquisition unit (acquisition unit 111 described later, for example) that acquires state data about a machine in a predetermined cycle; a first transmission unit (first transmission unit 112 described later, for example) that transmits partial data belonging to the state data and matching a first condition set in advance to a management server (management server 20 described later, for example); a storage unit (storage unit 12 described later, for example) that stores state data not having been transmitted from the first transmission unit to the management server; and a second transmission unit (second transmission unit 113 described later, for example) that, in response to a first command including designation of a time in the past, transmits state data from the designated time onward stored in the storage unit to the management server.

(2) In the collection device described in (1), the first condition may be fulfilled by selecting the state data at a transmission frequency with a cycle longer than the predetermined cycle.

(3) In the collection device described in (1) or (2), the first condition may be fulfilled by selecting the type of the state data.

(4) In the collection device described in any one of (1) to (3), the first transmission unit may change the first condition to a second condition under which data of a volume smaller than a data volume under the first condition is to be transmitted in response to a second command issued based on the actuation of the second transmission unit in a different collection device connected to the management server.

(5) In the collection device described in (4), the second transmission unit may receive the first command from the management server and the first transmission unit may receive the second command from the management server.

(6) In the collection device described in (4), based on a warning contained in the state data, the acquisition unit may provide the second transmission unit with the first command designating a time earlier by a predetermined period than a time of the issuance of the warning, and provide the different collection device with the second command.

(7) In the collection device described in any one of (4) to (6), the first transmission unit may change the second condition to the first condition in response to a third command for making a return to an initial state, and the collection device may comprise a third transmission unit (third transmission unit 114 described later, for example) that transmits state data yet to be transmitted, matching the first condition, and being stored in the storage unit to the management server in response to the third command.

(8) A collection method according to the present invention is implemented by a computer (collection device 10 described later, for example). The method comprises: an acquisition step of acquiring state data about a machine in a predetermined cycle; a first transmission step of transmitting partial data belonging to the state data and matching a first condition set in advance to a management server (management server 20 described later, for example); a storage step of storing state data not having been transmitted to the management server in the first transmission step; and a second transmission step of, in response to a first command including designation of a time in the past, transmitting state data from the designated time onward stored in the storage step to the management server.

(9) A collection program according to the present invention is for causing a computer (collection device 10 described later, for example) to execute: an acquisition step of acquiring state data about a machine in a predetermined cycle; a first transmission step of transmitting partial data belonging to the state data and matching a first condition set in advance to a management server (management server 20 described later, for example); a storage step of storing state data not having been transmitted to the management server in the first transmission step; and a second transmission step of, in response to a first command including designation of a time in the past, transmitting state data from the designated time onward stored in the storage step to the management server.

According to the present invention, detailed data in the past can be made available for viewing according to demand while the volume of communication data is reduced in a usual state.

DETAILED DESCRIPTION OF THE INVENTION

First Embodiment

Figure 1:
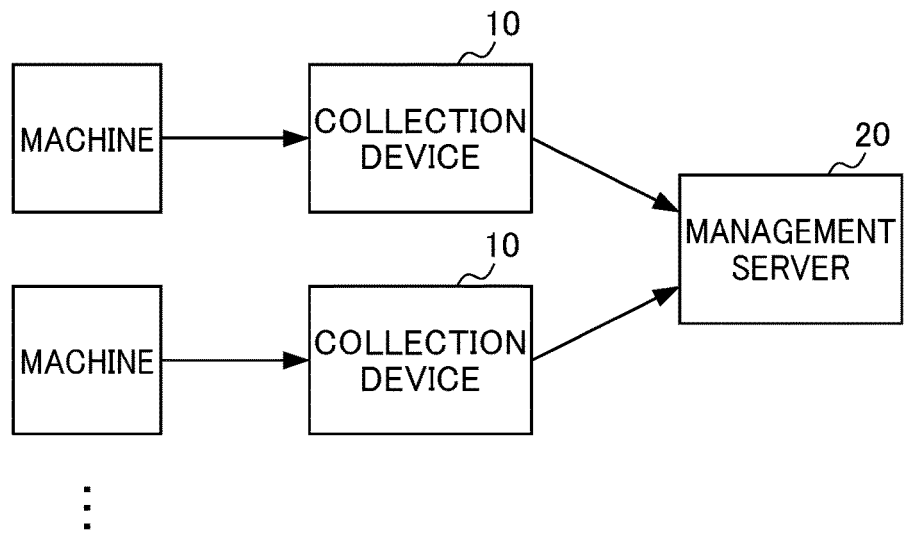
FIG. 1 is a schematic view showing the entire configuration of a management system according to an embodiment.

A first embodiment of the present invention will be described below. FIG. 1 is a schematic view showing the entire configuration of a management system 1 according to the first embodiment. The management system 1 includes collection devices 10 provided for each of a plurality of machines, and a management server 20 that receives state data from the plurality of collection devices 10 about each of the machines corresponding thereto. The collection device 10 is connected to the management server 20 so as to communicate with the management server 20 via a network. When the collection device 10 acquires various types of state data from a machine, the collection device 10 transmits the acquired data in real time to the management server 20.

Figure 2:
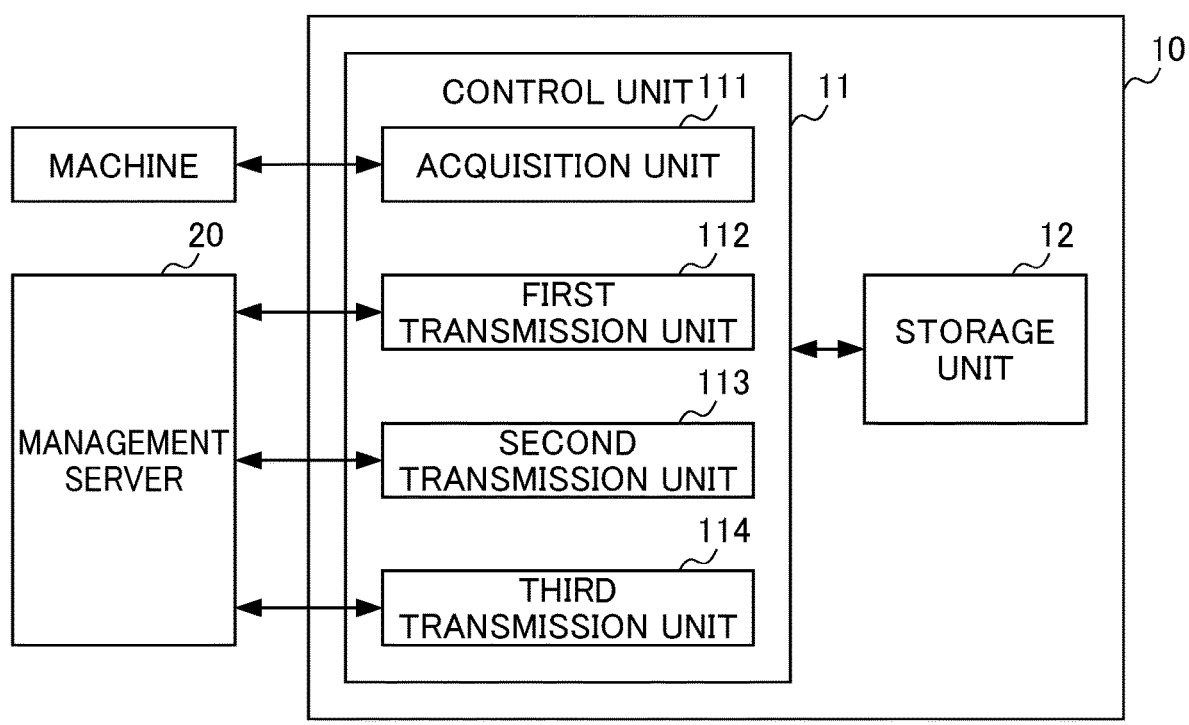
FIG. 2 is a block diagram showing the functional configuration of a collection device according to the embodiment.

FIG. 2 is a block diagram showing the functional configuration of the collection device 10 according to the first embodiment. The collection device 10 is an information processor (computer) including a control unit 11, a storage unit 12, and a communication interface for various types of data. The control unit 11 executes software (collection program) stored in the storage unit 12 to function as an acquisition unit 111, a first transmission unit 112, a second transmission unit 113, and a third transmission unit 114.

The acquisition unit 111 acquires state data about a machine in a predetermined cycle. In a usual state, the first transmission unit 112 transmits partial data belonging to the state data acquired by the acquisition unit 111 and matching a first condition set in advance by a user to the management server 20. State data not having been transmitted from the first transmission unit 112 to the management server 20 is stored into the storage unit 12.

The first condition is fulfilled by selecting the type of state data to be transmitted or selecting state data at a transmission frequency with a cycle equal to the predetermined cycle of acquisition from a machine or longer than the predetermined cycle. Specifically, the necessity of transmission in a usual state and a required frequency are set in advance as transmission conditions for each type of state data.

Information desired to be acquired at a high frequency includes the following pieces of information, for example:
(1) Feed speed (speeds of move along an X axis, a Y axis, and a Z axis);
(2) The position, speed, temperature, and load of a spindle motor or a servo motor; and
(3) A laser output command value and an actual value.

Information not to cause a trouble even if being acquired at a low frequency includes the following pieces of information, for example:
(4) Information about a program being executed;
(5) Machining information such as the number of machined parts or cutting time;
(6) An operating state such as automatic operation, manual operation, or stop;
(7) Warning information such as insulation deterioration or battery voltage drop;
(8) Rotation speed or state of a cooling fan; and
(9) A cooling water temperature.

In response to receipt of a first command including designation of a time in the past or designation of a period from this time from the management server 20, the second transmission unit 113 selects entire or partial state data from the designated time onward stored in the storage unit 12 under a condition in terms of a predetermined frequency or data type, and transmits the selected state data to the management server 20. By doing so, state data thinned out as data unnecessary in a usual state is transmitted to the management server 20 to complement state data about a period requiring detailed analysis such as state data about a point in time when an abnormality was detected in a machine.

Meanwhile, a collection device 10 not having received the first command receives a second command from the management server 20 issued based on the actuation of the second transmission unit 113 in a different collection device 10 connected to the management server 20. In this collection device 10, in response to receipt of the second command from the management server 20, the first transmission unit 112 changes the first condition for transmission of state data for a usual state to a second condition under which data of a volume smaller than a data volume under the first condition is to be transmitted. By doing so, for the sake of a collection device 10 transmitting state data of a larger volume than usual, a different collection device 10 temporarily reduces the volume of transmission data, thereby suppressing increase in load on the network and the management server 20. The second condition may be a condition under which data transmission is to be interrupted completely.

Figure 3:
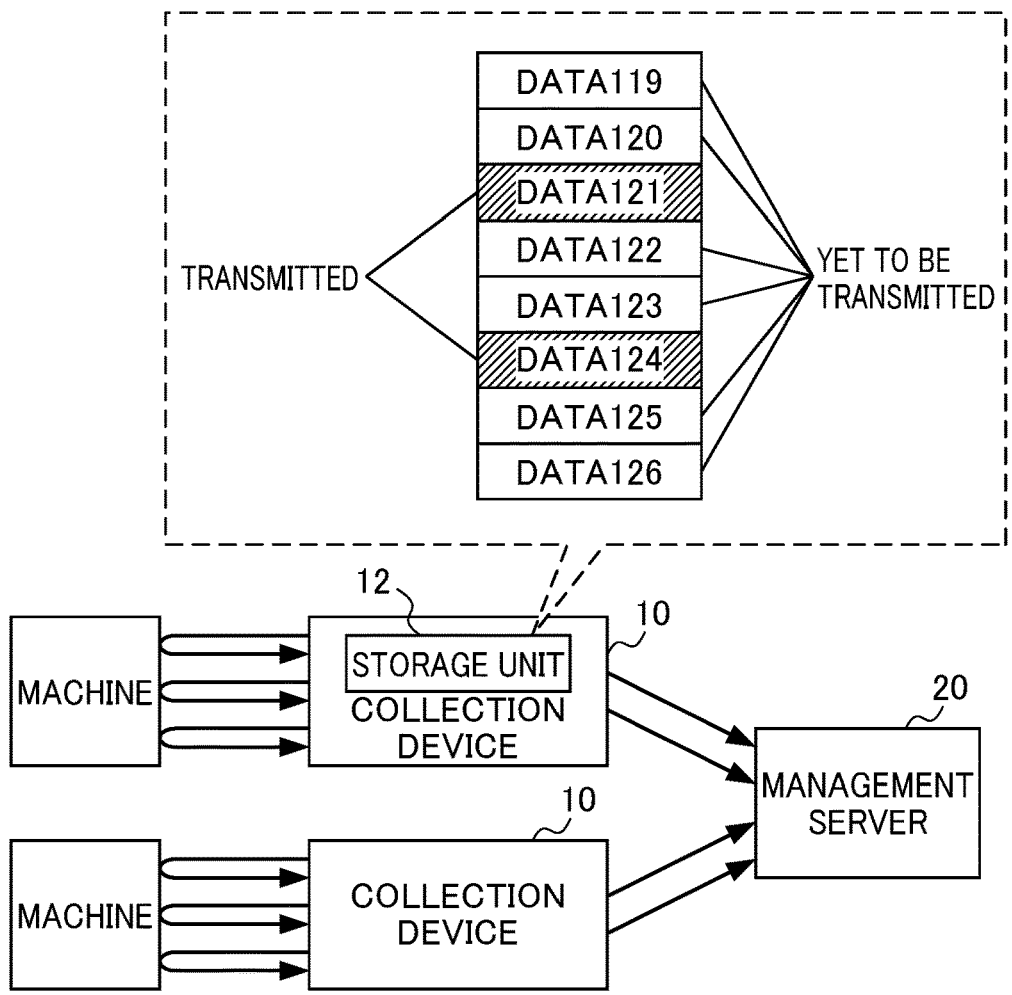
FIG. 3 shows how data is transmitted in a usual state from the collection device according to the embodiment.

FIG. 3 shows how data is transmitted in a usual state from the collection device 10 according to the first embodiment. The collection device 10 makes the first transmission unit 112 transmit part of state data (data 121 and data 124, for example) collected from a machine to the management server 20, and stores data yet to be transmitted into the storage unit 12. Transmitted data and data yet to be transmitted may be distinguished from each other, and both the transmitted data and the data yet to be transmitted may be stored into the storage unit 12 thereafter.

Figure 4:
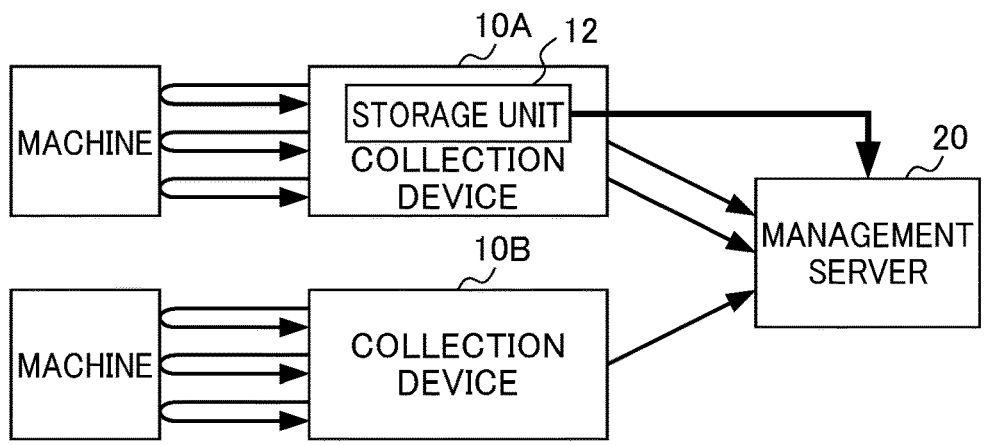
FIG. 4 shows how a condition for transmission to a management server is changed in the collection device based on a first command and a second command according to the embodiment.

FIG. 4 shows how a condition for transmission to the management server 20 is changed in the collection device 10 based on the first command and the second command according to the first embodiment. When a collection device 10A receives the first command from the management server 20, the collection device 10A makes the second transmission unit 113 transmit state data yet to be transmitted (such as data 119 and data 120 in FIG. 3, for example) stored in the storage unit 12 to the management server 20. At this time, in response to receipt of the second command from the management server 20, a collection device 10B changes a condition for transmission of state data to suppress the volume of transmission data.

As described above, if the management server 20 detects an abnormality in a machine based on state data (warning information, for example) collected by the management server 20 or if the management server 20 receives a request to acquire detailed information from a user, the management server 20 transmits the first command to a machine specified for the presence of the detected abnormality, for example, and transmits the second command to a different machine. By doing so, if a collection device 10 corresponding to the specified machine has transmitted information in a thinned-out fashion desired to be acquired at a high frequency such as the foregoing information (1), (2), or (3) under the first condition, this collection device 10 transmits stored data yet to be transmitted to the management server 20. At this time, a collection device 10 corresponding to the different machine continues transmitting only information not to cause a trouble even if being acquired at a low frequency such as the foregoing information (6) and information (7) to the management server 20 at a minimum frequency under the second condition.

Figure 5:
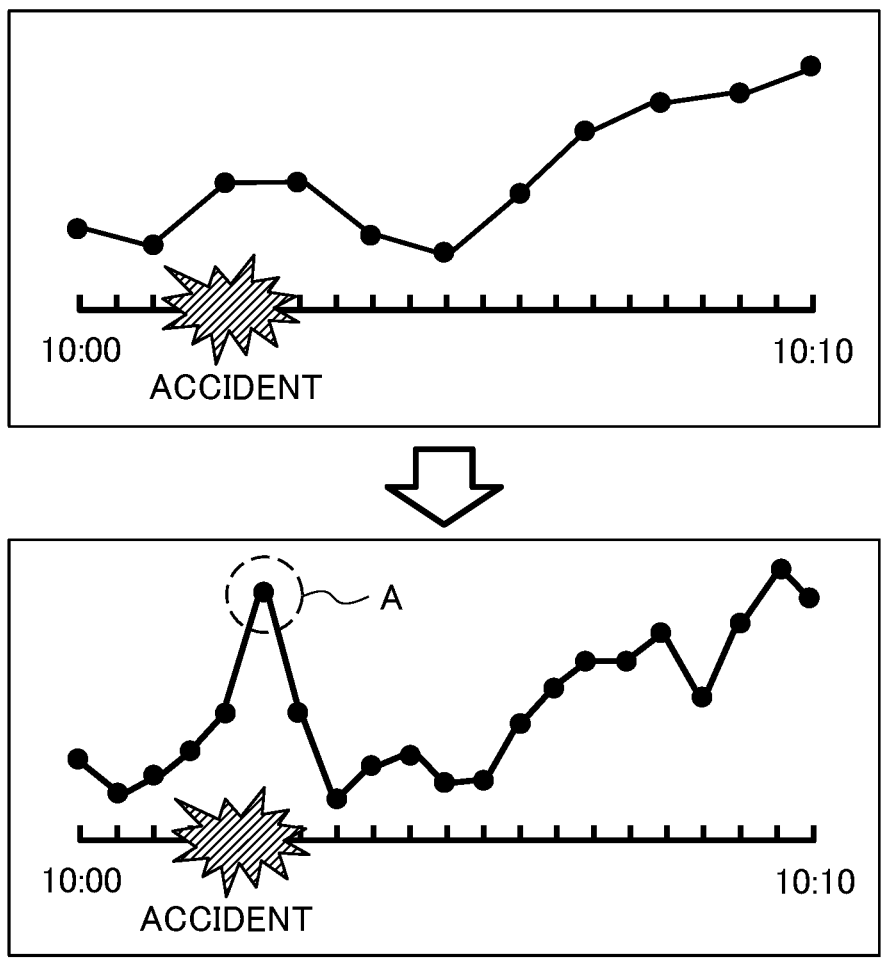
FIG. 5 shows an example of change in state data provided from the collection device to the management server according to the embodiment.

FIG. 5 shows an example of change in state data provided from the collection device 10 to the management server 20 according to the first embodiment. As shown in the upper part of FIG. 5, in a usual state, the collection device 10 transmits certain state data in a cycle of one minute to the management server 20.

If the collection device 10 receives the first command in response to the occurrence of an accident, the collection device 10 transmits data stored in the storage unit 12 to the management server 20. The cycle is changed to a cycle of 30 seconds to complement state data in the management server 20, as shown in the lower part of FIG. 5. This causes the management server 20 to grasp detailed information such as a peak A of the state data generated on the occurrence of the accident, for example.

If the collection device 10 receives a third command thereafter from the management server 20 for making a return to an initial state, the first transmission unit 112, which has transmitted data of a reduced volume, changes the second condition for transmission of state data to the first condition for a usual state. Then, data transmission from the second transmission unit 113 is stopped. The management server 20 transmits the third commands to the collection device 10 at a timing determined by the management server 20 based on state data, such as a timing of stop of a machine or a timing of recovery of the machine from an abnormal state, or at a timing determined to be appropriate by a user, for example.

When a condition for transmission of state data from the first transmission unit 112 is returned from the second condition to the first condition for a usual state in response to the third command, the third transmission unit 114 transmits state data yet to be transmitted, matching the first condition, and being stored in the storage unit 12 to the management server 20. By doing so, state data accumulated by reducing a transmission data volume further than usual, namely, state data ought to have been transmitted in a usual state, is transmitted from the collection device 10 to the management server 20.

Figure 6:
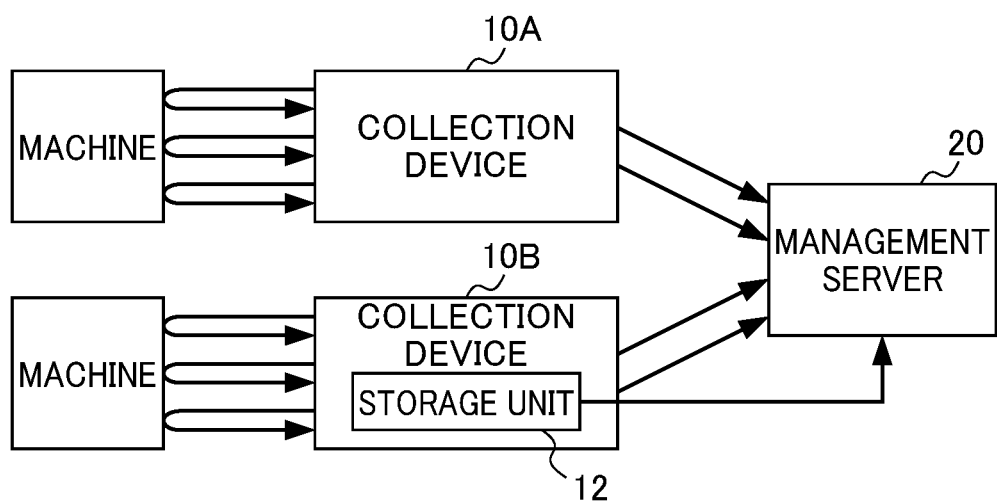
FIG. 6 shows how a condition for transmission to the management server is changed in the collection device based on a third command according to the embodiment.

FIG. 6 shows how a condition for transmission to the management server 20 is changed in the collection device 10 based on the third command according to the first embodiment. When the collection device 10A receives the third command from the management server 20, the collection device 10A stops data transmission from the second transmission unit 113, thereby making a transition from a state like the one in FIG. 4 in which a transmission data volume is larger than usual to a state substantially equal to the one in FIG. 3.

In response to receipt of the third command, the collection device 10B changes a condition for transmission to restore a transmission data volume substantially equal to the one in FIG. 3 from a state like the one in FIG. 4 in which a transmission data volume is smaller than usual. In a period when a transmission data volume is small, the volume of accumulated data yet to be transmitted is larger than usual. Thus, to restore state data in a usual state at the management server 20, state data limited further than usual is transmitted from the third transmission unit 114 to the management server 20.

According to the first embodiment, to reduce load on the network or the management server 20, the collection device 10 limits transmission of state data in a usual state under the first condition, and stores state data yet to be transmitted into the storage unit 12. In response to the first command from the management server 20, the collection device 10 transmits state data yet to be transmitted from a designated time onward to the management server 20. Thus, each collection device 10 can provide detailed data in the past to the management server 20 according to demand while reducing a transmission data volume in a usual state under collective management by the management server 20. This allows a user to view the detailed data in the past. As a result, the user becomes capable of viewing detailed data in the past according to demand on the occurrence of an abnormality in a machine or in response to user's operation for magnifying a display scale for checking the state of the machine in detail while an abnormality is absent in the machine, for example.

The first condition for limiting a transmission data volume is fulfilled by determining a transmission frequency with a cycle longer than a predetermined period for collection from a machine by the collection device 10, or limiting the type of state data to be transmitted. In this way, the collection device 10 thins out state data collected from the machine based on a temporal cycle or a data type. By doing so, the collection device 10 becomes capable of easily providing information conforming to a setting intended by a user.

Each of the collection devices 10 provided for corresponding ones of multiple machines limits a transmission data volume further than usual under the second condition while a different one of the collection devices 10 transmits data in the past yet to be transmitted to the management server 20, and stores data yet to be transmitted into the storage unit 12. Thus, the collection device 10 can provide detailed state data about a specified machine while increase in load on the network and the management server 20 is suppressed in the system as a whole. Thus, while state data is usually collected from 10 machines, for example, collecting state data only from one of the machines and stopping collection from the other machines allows the management server 20 to acquire state data having tenfold accuracy while load on the network and the management server 20 is maintained at a substantially equal level. In this way, the management system 1 can flexibly control a condition for collection of state data such as a frequency. As a result, a cause for an abnormality having occurred in a machine can be examined with higher accuracy.

After the collection device 10 changes a condition for transmission to the management server 20, the transmission condition is returned to an initial state in response to receipt of the third command from the management server 20. At this time, the collection device 10 transmits state data, yet to be transmitted but ought to have been transmitted in a usual state, to the management server 20. This allows the collection device 10 to transmit every piece of state data, to be transmitted at least under a transmission condition for a usual state, to the management server 20.

The first transmission unit 112 transmits state data in real time to the management server 20 acquired from a machine. Meanwhile, each of the second transmission unit 113 and the third transmission unit 114 transmits state data stored in the storage unit 12 collectively to the management server 20 in response to a request. Thus, each of the second transmission unit 113 and the third transmission unit 114 reduces overhead, compared to transmission of each piece of data in real time, so that increase in load on the network can be suppressed.

Second Embodiment

A second embodiment of the present invention will be described below. In the first embodiment, each of the multiple collection devices 10 operates each functional unit based on a command from the management server 20. In the second embodiment, the collection devices 10 communicate with each other. Further, the collection device 10 calculates the first command and the second command.

The collection device 10 has a functional configuration similar to that of the first embodiment shown in FIG. 2. However, details of the function of the acquisition unit 111 are different. More specifically, based on a warning contained in state data, the acquisition unit 111 calculates the first command designating a time earlier by a predetermined period than a time of the issuance of the warning, and provides the second transmission unit 113 belonging to the same device with the calculated first command. Further, the acquisition unit 111 calculates the second command responsive to the first command, and broadcasts the calculated second command to the other collection devices 10.

If the acquisition unit 111 has detected recovery from a trouble based on state data, the acquisition unit 111 may calculate the third command itself for making a return to an initial state, and broadcast the calculated third command. Alternatively, the third command may be received as user's instruction from the management server 20.

According to the second embodiment, the collection device 10 calculates the first command and the second command based on state data collected by the collection device 10 itself independently of control by the management server 20, and changes a condition for transmission to the management server 20. This reduces processing load on the management server 20 that manages a large number of collection devices 10 collectively.

The present invention should not be limited to the embodiments described above. The effects described in the embodiments are merely a list of the most preferable effects resulting from the present invention. Effects achieved by the present invention should not be limited to those described in the embodiments.

In the foregoing embodiments, the first transmission unit 112 is not to change processing in response to the first command. However, this is not the only case. From a point in time when the first command is received onward, the first transmission unit 112 may transmit collected state data in real time under a transmission condition including an additional condition used by the second transmission unit 113.

A collection method implemented by the management system 1 is realized by software. To realize the collection method by software, programs constituting the software are installed on a computer. These programs may be stored in a removable medium and distributed to a user. Alternatively, these programs may be distributed by being downloaded to a computer of the user via a network.

EXPLANATION OF REFERENCE NUMERALS

1 Management system
10 Collection device
11 Control unit
12 Storage unit
20 Management server
111 Acquisition unit
112 First transmission unit
113 Second transmission unit
114 Third transmission unit

What is claimed is:

1. A collection device comprising:
a memory; and
a processor, wherein the processor is configured to:
acquire state data about a machine in a predetermined cycle;
transmit partial data belonging to the state data and matching a first condition set in advance to a management server;
store, in the memory, a portion of the state data that has not been transmitted to the management server; and
transmit, in response to a first command including a designated time in the past, the portion of the state data from the designated time onward stored in the memory to the management server,
wherein the processor changes from the first condition to a second condition under which a volume of data smaller than a data volume under the first condition is to be transmitted in response to a second command issued based on a first command in a different collection device connected to the management server.

2. The collection device according to claim 1, wherein the first condition is fulfilled by selecting the state data at a transmission frequency with a cycle longer than the predetermined cycle.

3. The collection device according to claim 1, wherein the first condition is fulfilled by selecting a type of the state data.

4. The collection device according to claim 1 wherein the processor receives the first command from the management server and the second command from the management server.

5. The collection device according to claim 1, wherein, based on a warning contained in the state data, the processor issues the first command designating a time earlier by a predetermined period than a time of issuance of the warning as the designated time, and also issues the second command.

6. The collection device according to claim 1 wherein
the processor changes from the second condition to the first condition in response to a third command for making a return to an initial state, and
the processor transmits the partial data belonging to the state data yet to be transmitted, matching the first condition, and being stored in the memory to the management server in response to the third command.

7. A collection method implemented by a computer, the collection method comprising:
an acquisition step of acquiring state data about a machine in a predetermined cycle;
a first transmission step of transmitting partial data belonging to the state data and matching a first condition set in advance to a management server;
a storage step of storing a portion of the state data that has not been transmitted to the management server in the first transmission step;
a second transmission step of, in response to a first command including a designated time in the past, transmitting the portion of the state data from the designated time onward stored in the storage step to the management server; and
a changing step of changing from the first condition to a second condition under which a volume of data smaller than a data volume under the first condition is to be transmitted in response to a second command issued based on a first command in a different collection device connected to the management server.

8. A non-transitory computer-readable storage medium storing a collection program for causing a computer to execute:
an acquisition step of acquiring state data about a machine in a predetermined cycle;
a first transmission step of transmitting partial data belonging to the state data and matching a first condition set in advance to a management server;
a storage step of storing a portion of the state data that has not been transmitted to the management server in the first transmission step;
a second transmission step of, in response to a first command including a designated time in the past, transmitting the portion of the state data from the designated time onward stored in the storage step to the management server; and
a changing step of changing from the first condition to a second condition under which a volume of data smaller than a data volume under the first condition is to be transmitted in response to a second command issued based on a first command in a different collection device connected to the management server.

* * * * *